(12) United States Patent
Russell

(10) Patent No.: US 10,571,933 B2
(45) Date of Patent: Feb. 25, 2020

(54) UNMANNED AERIAL VEHICLES

(71) Applicant: Iain Matthew Russell, London (GB)

(72) Inventor: Iain Matthew Russell, London (GB)

(*) Notice: Subject to any disclaimer, the term of this patent is extended or adjusted under 35 U.S.C. 154(b) by 0 days.

(21) Appl. No.: 16/112,808

(22) Filed: Aug. 27, 2018

(65) Prior Publication Data

US 2019/0187726 A1 Jun. 20, 2019

(30) Foreign Application Priority Data

Feb. 8, 2017 (GB) .................................. 1802100.6
Dec. 19, 2017 (GB) .................................. 1721352.1

(51) Int. Cl.
| | |
|---|---|
| G05D 1/10 | (2006.01) |
| B64C 39/02 | (2006.01) |
| B64D 45/08 | (2006.01) |
| B64D 47/08 | (2006.01) |
| G05D 1/00 | (2006.01) |
| G08G 5/04 | (2006.01) |
| G05D 1/06 | (2006.01) |

(52) U.S. Cl.
CPC ........... *G05D 1/102* (2013.01); *B64C 39/024* (2013.01); *B64D 45/08* (2013.01); *B64D 47/08* (2013.01); *G05D 1/0055* (2013.01); *G05D 1/0088* (2013.01); *G05D 1/0094* (2013.01); *G05D 1/0661* (2013.01); *G08G 5/04* (2013.01); *B64C 2201/024* (2013.01); *B64C 2201/127* (2013.01); *B64C 2201/141* (2013.01)

(58) Field of Classification Search
CPC .... G05D 1/102; G05D 1/0055; G05D 1/0088; G05D 1/0094; B64C 39/024; B64C 2201/024; B64C 2201/127; B64C 2201/141; B64D 45/08; B64D 47/08; G08G 5/04
See application file for complete search history.

(56) References Cited

U.S. PATENT DOCUMENTS

| | | | |
|---|---|---|---|
| 6,079,862 A * | 6/2000 | Kawashima | G01S 3/7864 348/169 |
| 9,421,869 B1 | 8/2016 | Ananthanarayanan | |
| 9,555,897 B2 | 1/2017 | Eline | |
| 9,720,413 B1 | 8/2017 | Lema | |
| 9,753,461 B1 | 9/2017 | Johnson | |
| 9,873,524 B2 | 1/2018 | Fisher | |
| 9,878,787 B2 | 1/2018 | Chan | |
| 10,407,182 B1 | 9/2019 | Alcorn | |
| 10,418,853 B2 | 9/2019 | Yang | |
| 2014/0240498 A1 | 8/2014 | Ohtomo | |
| 2014/0251743 A1 | 9/2014 | Childress | |
| 2014/0371952 A1 | 12/2014 | Ohtomo et al. | |

(Continued)

FOREIGN PATENT DOCUMENTS

| | | |
|---|---|---|
| CN | 204236781 U | 4/2015 |
| CN | 204979241 U | 1/2016 |

(Continued)

*Primary Examiner* — Aaron L Troost

(57) ABSTRACT

A UAV comprises a camera arrangement configurable such that a field of view of the camera arrangement includes airspace directly above the UAV, a lighting arrangement configurable in an upwards-facing configuration, and a controller operable to cause the lighting arrangement to illuminate an object in the airspace directly above the UAV.

19 Claims, 1 Drawing Sheet

(56) References Cited

U.S. PATENT DOCUMENTS

| | | |
|---|---|---|
| 2015/0314434 A1 | 11/2015 | Bevins |
| 2015/0379876 A1 | 12/2015 | Navot |
| 2016/0023761 A1 | 1/2016 | McNally |
| 2016/0068264 A1 | 3/2016 | Ganesh et al. |
| 2016/0130010 A1 | 5/2016 | Keennon |
| 2016/0152345 A1* | 6/2016 | Molnar ................ B64C 39/024 244/39 |
| 2016/0347192 A1 | 12/2016 | Lee |
| 2017/0010623 A1* | 1/2017 | Tang ...................... G05D 1/101 |
| 2017/0221394 A1* | 8/2017 | Garcia Morchon ... G05D 1/104 |
| 2017/0240296 A1* | 8/2017 | Molnar ................... B05B 17/08 |
| 2019/0016254 A1* | 1/2019 | Salter ................... B60Q 1/2665 |
| 2019/0047696 A1 | 2/2019 | Gwin |
| 2019/0094149 A1 | 3/2019 | Troy |
| 2019/0149724 A1 | 5/2019 | Wu |
| 2019/0261490 A1* | 8/2019 | Harvey ................ F21V 14/003 |

FOREIGN PATENT DOCUMENTS

| | | |
|---|---|---|
| CN | 205633086 U | 10/2016 |
| CN | 106379121 A | 2/2017 |
| CN | 106379548 A | 2/2017 |
| CN | 206031806 U | 3/2017 |
| EP | 3193228 A2 | 7/2017 |
| GB | 2528489 A | 1/2016 |
| KR | 20170093579 A | 8/2017 |
| WO | 2018/045635 A1 | 3/2018 |

* cited by examiner

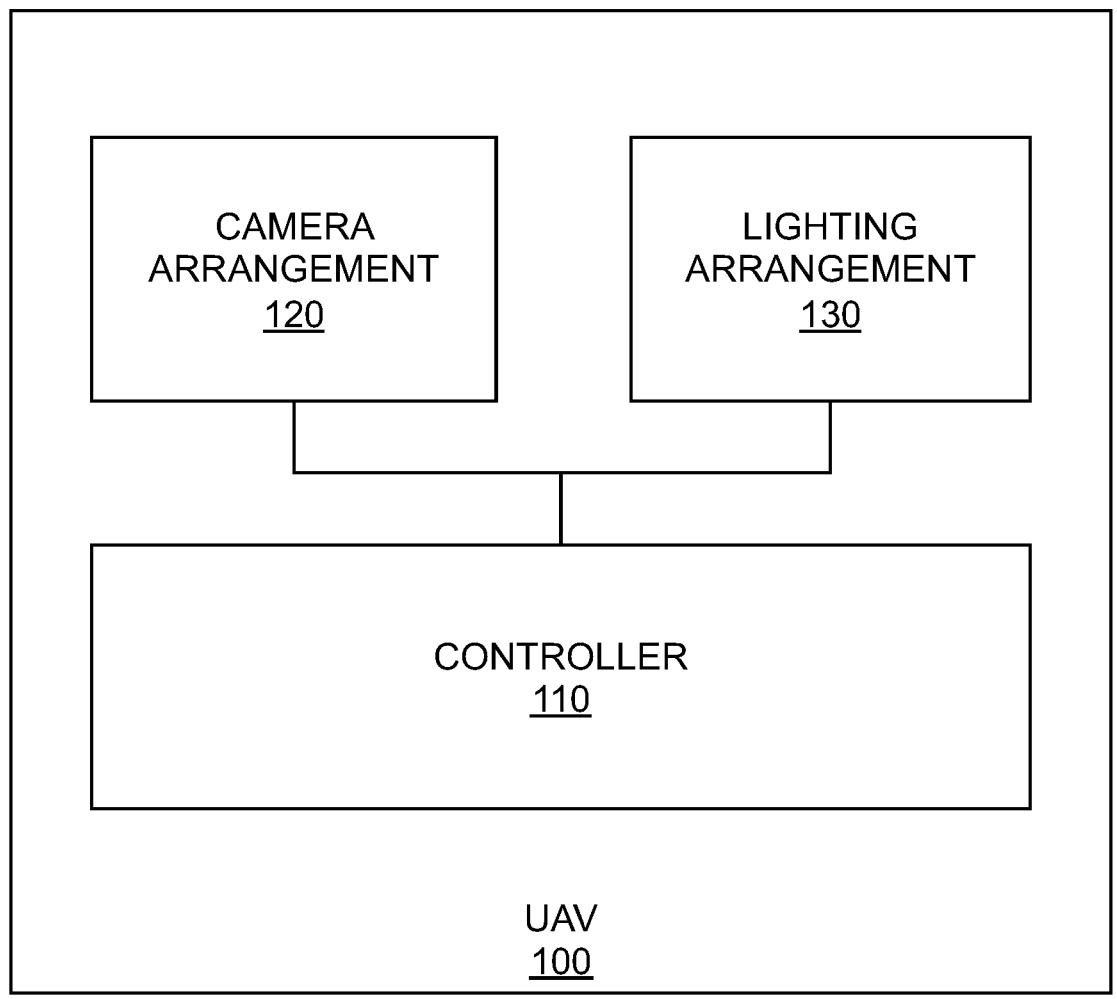

UNMANNED AERIAL VEHICLES

CROSS-REFERENCE TO RELATED APPLICATIONS

This application claims priority under 35 U.S.C. § 119(a) to UK Patent Application Nos. GB1721352.1, filed on Dec. 19, 2017 and GB1802100.6, filed on Feb. 8, 2018. The entire content of each of these patent applications is hereby incorporated by reference.

FIELD

This disclosure relates to unmanned aerial vehicles (UAVs).

BACKGROUND

A UAV, which may be known as a 'drone' or an 'unmanned aircraft system (UAS)', is an aircraft that does not have a human pilot aboard. Some known UAVs have a camera that can capture an image of a scene within the field of view of the camera. The usability of such images, by the UAV or otherwise, can be negatively impacted by various factors.

BRIEF DESCRIPTION OF FIGURES

Various features will now be described, by way of example only, with reference to the accompanying drawings in which:

FIG. 1 shows a block diagram of an example UAV in accordance with embodiments.

DETAILED DESCRIPTION

In examples described herein, a UAV can illuminate the airspace directly above the UAV to provide an improved image of a scene including the airspace, whether for use by the UAV or otherwise, compared to an image of the scene in which the illumination is not provided. This is especially effective when the UAV performs an autonomous take-off and where there is an object in the airspace above the UAV, but is also effective in other scenarios. For example, this can be effective in infrastructure inspection, where the inspection is performed by the UAV and/or a human inspector. The features described herein are particularly, but not exclusively, effective in low-light and/or poor weather conditions.

Referring to FIG. 1, there is shown an example of a UAV 100. The UAV 100 may be a rotocopter. Examples of rotocopters are quadcopters and hexacopters.

The UAV 100 comprises a controller 110. The controller 110 controls the UAV 100. The controller 110 comprises one or more components. The one or more components may be implemented in hardware and/or software. The controller 110 may be arranged to execute computer-readable instructions comprised in a computer program and, thus, to cause the techniques described herein to be performed.

The UAV 100 comprises a camera arrangement 120. The camera arrangement 120 may be communicatively coupled to the controller 110. The camera arrangement 120 captures image data. The image data may comprise still image data and/or video data. The camera arrangement 120 may capture visible light and/or infrared.

The camera arrangement 120 is configurable such that a field of view of the camera arrangement 120 includes airspace directly above the UAV 100. As such, the camera arrangement 120 can capture image data representing a scene including an object in the airspace directly above the UAV 100. Such an object may represent a potential collision risk for the UAV 100, particularly, but not exclusively, when the UAV 100 performs a vertical take-off, either autonomously or under the control of a human operator.

In some examples, the camera arrangement 120 has a fixed orientation. As such, the field of view of the camera arrangement 120 may permanently include the airspace directly above the UAV 100.

In other examples, the camera arrangement 120 has a dynamic orientation. As such, the field of view of the camera arrangement 120 may temporarily include the airspace directly above the UAV 100 and other airspace.

A fixed-orientation camera arrangement 120 may result in the UAV 100 having a relatively low manufacturing effort, a relatively low weight, a relatively low maintenance effort and/or a relatively high mechanical reliability compared to a dynamic-orientation camera arrangement 120. However, a dynamic-orientation camera arrangement 120 may result in the UAV 100 having a relatively large field of view and/or relatively few cameras compared to a fixed-orientation camera arrangement 120.

Where the camera arrangement 120 has a dynamic orientation, the controller 110 may be operable to adjust the orientation of the camera arrangement 120. This can provide more flexibility than a fixed-orientation camera arrangement 120.

Where the camera arrangement 120 has a dynamic orientation, the orientation of the camera arrangement 120 may be adjustable by hand. For example, a human operator of the UAV 100 may be able to select a desired orientation of the camera arrangement 120 pre-flight.

Where the camera arrangement 120 has a dynamic orientation, the controller 110 may be operable to adjust the orientation of the camera arrangement 120 in-flight. This can provide more flexibility than a dynamic camera arrangement 120 if the dynamic camera arrangement 120 cannot be adjusted in-flight. For example, a hand-adjustable dynamic camera arrangement may not be adjustable in-flight and may only be adjustable on the ground. The controller 110 may be operable to adjust the orientation of the camera arrangement 120 to track an object.

The camera arrangement 120 may comprise a single camera or may comprise multiple cameras. Multiple cameras may operate as a stereo pair. Multiple cameras may provide a larger field of view than the field of view of a single camera. Multiple cameras may enable electromagnetic radiation from different parts of the spectrum to be captured. For example, multiple cameras may enable both visible light and infrared to be captured.

The UAV 100 comprises a lighting arrangement 130. The lighting arrangement 130 emits electromagnetic radiation. The emitted electromagnetic radiation may be visible light and/or infrared.

The lighting arrangement 130 may be outside the field of view of the camera arrangement 120. As such, enhanced performance may be provided by the lighting arrangement 130 as described herein, without the lighting arrangement 130 interrupting the field of view of the camera arrangement 120.

The lighting arrangement 130 may, alternatively, be within the field of view of the camera arrangement 120. This may provide a more compact UAV 100 depending on the nature of, for example, the camera arrangement 120 and/or the lighting arrangement 130.

In some examples, the lighting arrangement 130 has a fixed orientation.

In other examples, the lighting arrangement 130 has a dynamic orientation.

A fixed-orientation lighting arrangement 130 may result in the UAV 100 having a relatively low manufacturing effort, a relatively low weight, a relatively low maintenance effort and/or a relatively high mechanical reliability compared to a dynamic-orientation lighting arrangement 130. However, a dynamic-orientation lighting arrangement 130 may result in the UAV 100 being able to illuminate a relatively large area and/or have relatively few light sources compared to a fixed-orientation lighting arrangement 130.

Where the lighting arrangement 130 has a dynamic orientation, the controller 110 may be operable to adjust the orientation of the lighting arrangement 130. This can provide more flexibility than a fixed-orientation lighting arrangement 130. The controller 110 may be operable to adjust the orientation of the lighting arrangement 130 to track an object.

Where the lighting arrangement 130 has a dynamic orientation, the orientation of the lighting arrangement 130 may be adjustable by hand. For example, a human operator of the UAV 100 may be able to select a desired orientation of the lighting arrangement 130 pre-flight.

Where the lighting arrangement 130 has a dynamic orientation, the controller 110 may be operable to adjust the orientation of the lighting arrangement 130 in-flight. This can provide more flexibility than a fixed lighting arrangement 130 that cannot be adjusted in-flight. For example, a hand-adjustable lighting arrangement 130 may not be adjustable in-flight and may only be adjustable on the ground.

The lighting arrangement 130 may comprise a single light source or multiple light sources. Multiple lights sources may emit electromagnetic radiation at different frequencies. An example of a light source is a light-emitting diode, LED.

The lighting arrangement 130 may be powered by a power source of the UAV 100 that also powers a motor of the UAV 100. As such, a common power source can be used for both the lighting arrangement 130 and the motor. Charging of the power source may be facilitated in such situations. A more compact UAV 100 may be provided compared to having separate power sources for the motor and the lighting arrangement 130 particularly, but not exclusively, where the lighting arrangement 130 comprises multiple light sources.

The controller 110 is operable to cause the lighting arrangement 130 to illuminate an object in the airspace directly above the UAV 100. As such, a clearer view of the object may be possible. This may be particularly effective in low-light and/or poor weather conditions.

The controller 110 may be operable to cause the lighting arrangement 130 to illuminate the object based on image data received from the camera arrangement 120. For example, the controller 110 may cause the lighting arrangement 130 to illuminate the object in response to recognising the object in the image data received from the camera arrangement 120. The controller 110 may cause the lighting arrangement 130 to illuminate the object in response to recognising the object in the image data received from the camera arrangement 120 as an object having a predetermined property. The controller 110 may cause the lighting arrangement 130 not to illuminate the object in response to recognising the object in the image data received from the camera arrangement 120 as an object having a predetermined property. Examples of such predetermined properties include, but are not limited to, type, size and shape. For example, the controller 110 may cause the lighting arrangement 130 not to illuminate aircraft.

The controller 110 may be operable to cause the lighting arrangement 130 to illuminate the object in response to the object being in the field of view of the camera arrangement 120. The controller 110 may be able to determine that the object is in the field of view of the camera arrangement 120 based on image data received from the camera arrangement 120.

The controller 110 may be operable to cause the lighting arrangement 130 to illuminate the object in response to the object being less than a threshold distance from the UAV 100. The controller 110 may be able to determine that the object is less than a threshold distance from the UAV 100 based on image data received from the camera arrangement 120. As such, objects that present a potential collision risk based on their distance from the UAV 100 may be illumined so that more accurate image data representing them may be captured. This may be especially effective in low-light and/or poor weather conditions. The controller 110 may be operable to cause the lighting arrangement 130 not to illuminate the object in response to the object being more than the threshold distance from the UAV 100.

The controller 110 may be operable to cause the lighting arrangement 130 to illuminate the object in response to detecting a collision risk with the object. The controller 110 may be able to detect a collision risk with the object based on image data received from the camera arrangement 120. As such, objects that present a potential collision risk based on their distance from the UAV 100 may be illumined so that more accurate image data representing them may be captured.

The controller 110 may be operable to cause the lighting arrangement 130 to illuminate the object during a vertical take-off. The vertical take-off may be an autonomous vertical take-off. There is a particular risk of collision with an object above the UAV 100 during vertical take-off. Illuminating such an object when the UAV 100 is controlled by a human operator is effective, since it increases the likelihood of the human operator being able to see the object and take corrective action. Illuminating such an object when the UAV 100 operators autonomously is especially effective, however, as the UAV 100 has a lower chance of collision with the object if the object can more clearly be detected by the UAV 100.

The controller 110 may be operable to cause the lighting arrangement 130 to illuminate the object in anticipation of a vertical take-off. For example, the controller 110 may be operable to determine that vertical take-off is to be initiated and the controller 110 may be operable to cause the lighting arrangement 130 to illuminate the object in anticipation of the vertical take-off that is to be initiated. This may allow the UAV 100 to better survey its environment prior to vertical take-off.

The controller 110 may be operable to cause the lighting arrangement 130 to illuminate the object based on data received from the object. The data received from the object may comprise a request to illuminate the object.

The controller 110 may be operable to control the lighting arrangement 130 autonomously. In other words, the controller 110 may be operable to control the lighting arrangement 130 without input from an entity other than the UAV. An example of such an entity is a human operator of the UAV 100.

The controller 110 may be operable to control the lighting arrangement 130 based on data received from a control device of human operator of the UAV 100. The data received from the control device may comprise a request to illuminate the object.

The controller 110 may be operable to control the lighting arrangement 130 based on data received from an entity other than the human operator of the UAV 100. The data may comprise a request to illuminate the object. The entity other than the human operator may, for example, be an aviation authority, entity responsible for a restricted airspace etc.

The controller 110 may be operable to control the lighting arrangement 130 based on location, time of day, day of week, manual command, battery level etc. For example, the controller 110 may be operable to control the lighting arrangement 130 to illuminate or not illuminate in one or more predetermined locations, at one or more predetermined times of day, on one or more predetermined days of the week, in response to one or more manual commands, in response to a battery level being above or below a battery level threshold.

The UAV 100 may comprise one or more different components (for example more, fewer and/or alternative) components than those depicted in FIG. 1.

Various measures (for example UAVs, controllers and methods) are provided in which a UAV comprises a camera arrangement configurable such that a field of view of the camera arrangement includes airspace directly above the UAV. The UAV comprises a lighting arrangement configurable in an upwards-facing configuration. The UAV comprises a controller operable to cause the lighting arrangement to illuminate an object in the airspace directly above the UAV. As such, a clearer view of the object may be obtained, compared to a non-illuminated view.

The controller may be operable to cause the lighting arrangement to illuminate the object based on image data received from the camera arrangement. As such, information relating to the object and/or airspace may be factored into the illumination of the object.

The controller may be operable to cause the lighting arrangement to illuminate the object in response to the object being in the field of view of the camera arrangement. An object being visible by the camera arrangement is an indicator that the object presents a potential collision risk.

The controller may be operable to cause the lighting arrangement to illuminate the object in response to the object being less than a threshold distance from the UAV. A clearer impression of the object may be obtained, compared to a non-illuminated impression, such that action may be taken in relation to a close object, for example to try to avoid collision.

The controller may be operable to cause the lighting arrangement to illuminate the object in response to detecting a collision risk with the object. A clearer impression of the object may be obtained, compared to a non-illuminated impression, such that action may be taken in relation to an object that presents a significant collision risk.

The controller may be operable to cause the lighting arrangement to illuminate the object in anticipation of vertical take-off. By illuminating the object prior to vertical take-off, a greater understanding of the environment surrounding the UAV can potentially be obtained than when the object is illuminated only during vertical take-off. Vertical take-off could, for example, be aborted if the object presents a particularly significant collision risk.

The controller may be operable to cause the lighting arrangement to illuminate the object during vertical take-off. The lighting arrangement is effective for vertical take-offs where the risk of collision with an object above the UAV may be higher than in other flight procedures.

The vertical take-off may be an autonomous vertical take-off. The lighting arrangement is particularly effective for autonomous vertical take-offs where the UAV itself provides collision with limited or no intervention from a human operator.

The controller may be operable to cause the lighting arrangement to illuminate the object based on data received from the object. The UAV can use data communicated by an external entity to determine that the object should be illuminated.

The controller may be operable to control the lighting arrangement autonomously. This may provide low-latency and/or proactive lighting.

The controller may be operable to control the lighting arrangement based on data received from a control device of a human operator of the UAV. As such, a remote human operator can instruct the UAV to illuminate the object. This may be especially effective where the human operator can perceive a risk that the UAV cannot or does not perceive.

The UAV may comprise a power source and a motor. The power source may be arranged to power the motor. The power source may be arranged to power the lighting arrangement. As such, a relatively compact and/or efficient-charging UAV may be provided.

The camera arrangement and/or the lighting arrangement may have a fixed orientation. This may provide a relatively uncomplicated and/or low-effort-to-maintain UAV.

The camera arrangement and/or the lighting arrangement may have a dynamic orientation. This may provide a relatively flexible UAV.

The controller may be operable to adjust the orientation of the camera arrangement and/or the lighting arrangement. This is especially effective where the UAV operates autonomously, such that the camera arrangement and/or the lighting arrangement can be controlled with no or limited human operator input.

The controller may be operable to adjust the orientation of the camera arrangement and/or the lighting arrangement in-flight. This allow relatively high in-flight flexibility compared, for example, to a UAV in which the orientation of the camera arrangement and/or the lighting arrangement can only be adjusted when the UAV is grounded.

Various measures (for example UAVs, controllers and methods) are provided in which a UAV comprises a lighting arrangement. The UAV comprises a controller operable to cause the lighting arrangement to illuminate airspace directly above the UAV in anticipation of and/or during an autonomous vertical take-off performed by the UAV. As such, illumination may be provided at a particularly effective time where the risk of collision with an object above the UAV is relatively highly likely and where human operator intervention may not be available.

Various measures (for example UAVs, controllers and methods) are provided in which a UAV comprises an upwards-facing lighting arrangement controllable, while the UAV is in-flight, by a human operator of the UAV and/or autonomously by a controller comprised in the UAV. As such, control is provided to the human operator without the UAV having to return to the ground for the lighting to be controlled. Controlling the lighting arrangement may comprise causing the lighting arrangement to illuminate and/or not to illuminate.

Various measures (for example UAVs, controllers and methods) are provided in which a UAV a lighting arrangement arranged to illuminate an interior of the UAV and/or a camera arrangement configurable to have a field of view including an interior of the UAV. As such, an interior of the UAV may be more readily inspected. An interior-facing lighting arrangement may facilitate inspection even where a camera arrangement is not provided, since a human inspector can more readily inspect the interior of the UAV. An interior-facing camera arrangement may facilitate inspection even where a lighting arrangement is not provided, since a human inspector can remotely inspect the interior of the UAV and/or inspect the interior of the UAV without disassembling the UAV. The interior may be sufficiently illuminated without the additional lighting arrangement.

Various modifications and alternatives will be apparent to one skilled in the art.

Examples are described above in which the UAV 100 comprises a camera arrangement 120. In further examples, the UAV 100 does not comprise the camera arrangement 120. Although the examples described above are especially effective where the UAV 100 comprises the camera arrangement 120 (so that improved images may be obtained for use by the UAV 100 or otherwise), it may still be effective to provide an illuminating effect above the UAV 100 even where the UAV 100 does not comprise the camera arrangement 120. For example, illumination above the UAV 100 may enable an object above the UAV 100 to detect the presence of the UAV 100 based on the illumination. The other object may, for example, be another UAV or otherwise.

Even where the UAV 100 comprises the camera arrangement 120, examples are envisaged in which the camera arrangement 120 is not configurable such that a field of view of the camera arrangement 120 includes airspace directly above the UAV 100. For example, the camera arrangement 120 may be configurable to have a field of view to one or more sides of, behind, and/or below the UAV 100.

Examples are described above in which the camera arrangement 120 has a field of view including an exterior of the UAV 100, namely above, to one or more sides of and/or below the UAV 100. In further examples, the camera arrangement 120 has a field of view including an interior of the UAV 100. The lighting arrangement 130 may illuminate the interior of the UAV 100 to enable the camera arrangement 120 to capture a useable image of the interior of the UAV 100. Such an image may be used, for example, for fault reporting.

Examples are described above in which the lighting arrangement 130 is configurable in an upwards-facing configuration. In further examples, the lighting arrangement 130 is not configurable in an upwards-facing configuration. For example, the lighting arrangement 130 may be configurable to provide illumination in front of, to one or more sides of, behind, and/or below the UAV 100.

The lighting arrangement 130 may be used to provide information related to operation of the UAV 100 to another entity. For example, where the lighting arrangement 130 is configurable to provide illumination behind the UAV 100, the lighting arrangement 130 may emit red light to indicate that the UAV 100 is breaking, a flashing amber light to indicate a hazard etc. Where the UAV 100 is associated with an emergency service, the UAV 100 may emit a flashing blue light when it is involved in an emergency operation.

Examples are described above in which the controller 110 is operable to cause the lighting arrangement 130 to illuminate an object in the airspace directly above the UAV 100. In further examples, the lighting arrangement 130 may be caused to illuminate an object in the airspace directly above the UAV 100 in another manner. For example, the lighting arrangement 130 may be controlled by hand to illuminate an object in the airspace directly above the UAV 100.

The lighting arrangement 130 may be turned on (in other words may be caused to illuminate) in response to a turn-on trigger. The lighting arrangement 130 may be turned off (in other words may be caused not to illuminate) in response to a turn-off trigger. Various turn-on and turn-off triggers are described above.

A further example is an ambient light level. For example, the lighting arrangement 130 may be turned on when the ambient light level drops below a threshold ambient light level. The lighting arrangement 130 may be turned off when the ambient light level rises above a threshold ambient light level.

A further example is a location of the UAV 100. For example, the lighting arrangement 130 may be turned on when the UAV 100 is or is not in a predetermined location. The lighting arrangement 130 may be turned off when the UAV 100 is or is not in a predetermined location.

A further example is a battery level of the UAV 100. For example, the lighting arrangement 130 may be turned on and/or may have the option of being turned on only when the battery level of the UAV 100 is above a threshold battery level value. The lighting arrangement 130 may be turned off when the UAV 100 is below a threshold battery level value.

Examples are described in which the lighting arrangement 130 illuminates or does not illuminate. In further examples, the lighting arrangement 130 provides one or more further degrees of illumination between full and no illumination.

The lighting arrangement 130 may be configured to convey information. For example, the lighting arrangement 130 may emit modulated light, where the modulated light carries modulated information to be conveyed to an observer of the emitted light.

The following numbered clauses on pages 11 to 13 of the present description correspond to the claims of UK patent application nos. GB1721352.1 and GB1802100.6, from which the present application claims priority, as filed. The claims of the present application as filed can be found on the subsequent pages 14 to 16 of the specification which begin with the heading "CLAIMS".

1. An unmanned aerial vehicle, UAV, comprising:
   a camera arrangement configurable such that a field of view of the camera arrangement includes airspace directly above the UAV;
   a lighting arrangement configurable in an upwards-facing configuration; and
   a controller operable to cause the lighting arrangement to illuminate an object in the airspace directly above the UAV.
2. A UAV according to clause 1, wherein the controller is operable to cause the lighting arrangement to illuminate the object based on image data received from the camera arrangement.
3. A UAV according to clause 1 or 2, wherein the controller is operable to cause the lighting arrangement to illuminate the object in response to the object being in the field of view of the camera arrangement.
4. A UAV according to any of clauses 1 to 3, wherein the controller is operable to cause the lighting arrangement to illuminate the object in response to the object being less than a threshold distance from the UAV.
5. A UAV according to any of clauses 1 to 4, wherein the controller is operable to cause the lighting arrangement to illuminate the object in response to detecting a collision risk with the object.

6. A UAV according to any of clauses 1 to 5, wherein the controller is operable to cause the lighting arrangement to illuminate the object in anticipation of vertical take-off.
7. A UAV according to any of clauses 1 to 6, wherein the controller is operable to cause the lighting arrangement to illuminate the object during vertical take-off.
8. A UAV according to clause 6 or 7, wherein the vertical take-off is an autonomous vertical take-off.
9. A UAV according to any of clauses 1 to 8, wherein the controller is operable to cause the lighting arrangement to illuminate the object based on data received from the object.
10. A UAV according to any of clauses 1 to 9, wherein the controller is operable to control the lighting arrangement autonomously.
11. A UAV according to any of clauses 1 to 10, wherein the controller is operable to control the lighting arrangement based on data received from a control device of a human operator of the UAV.
12. A UAV according to any of clauses 1 to 11, wherein the UAV comprises a power source and a motor, wherein the power source is arranged to power the motor, and wherein the power source is arranged to power the lighting arrangement.
13. A UAV according to any of clauses 1 to 12, wherein the camera arrangement and/or the lighting arrangement has a fixed orientation.
14. A UAV according to any of clauses 1 to 12, wherein the camera arrangement and/or the lighting arrangement has a dynamic orientation.
15. A UAV according to clause 14, wherein the controller is operable to adjust the orientation of the camera arrangement and/or the lighting arrangement.
16. A UAV according to clause 15, wherein the controller is operable to adjust the orientation of the camera arrangement and/or the lighting arrangement in-flight.
17. An unmanned aerial vehicle, UAV, comprising:
  a lighting arrangement; and
  a controller operable to cause the lighting arrangement to illuminate airspace directly above the UAV in anticipation of and/or during an autonomous vertical take-off performed by the UAV.
18. An unmanned aerial vehicle, UAV, comprising an upwards-facing lighting arrangement controllable, while the UAV is in-flight, remotely by a human operator of the UAV and/or autonomously by a controller comprised in the UAV.
19. An unmanned aerial vehicle, UAV, comprising a lighting arrangement arranged to illuminate an interior of the UAV and/or a camera arrangement configurable to have a field of view including the interior of the UAV.

What is claimed is:
1. An unmanned aerial vehicle, UAV, comprising:
  a camera arrangement configurable such that a field of view of the camera arrangement includes airspace directly above the UAV;
  a lighting arrangement configurable in an upwards-facing configuration; and
  a controller operable to cause, in anticipation of and/or during take-off, the lighting arrangement to illuminate an object in the airspace directly above the UAV.

2. The UAV of claim 1, wherein the controller is operable to cause the lighting arrangement to illuminate the object based on image data received from the camera arrangement.
3. The UAV of claim 1, wherein the controller is operable to cause the lighting arrangement to illuminate the object in response to the object being in the field of view of the camera arrangement.
4. The UAV of claim 1, wherein the controller is operable to cause the lighting arrangement to illuminate the object in response to the object being less than a threshold distance from the UAV.
5. The UAV of claim 1, wherein the controller is operable to cause the lighting arrangement to illuminate the object in response to detecting a collision risk with the object.
6. The UAV of claim 1, wherein the controller is operable to cause the lighting arrangement to illuminate the object in anticipation of vertical take-off.
7. The UAV of claim 1, wherein the controller is operable to cause the lighting arrangement to illuminate the object during vertical take-off.
8. The UAV of claim 6, wherein the vertical take-off is an autonomous vertical take-off.
9. The UAV of claim 1, wherein the controller is operable to cause the lighting arrangement to illuminate the object based on data received from the object.
10. The UAV of claim 1, wherein the controller is operable to control the lighting arrangement autonomously.
11. The UAV of claim 1, wherein the controller is operable to control the lighting arrangement based on data received from a control device of a human operator of the UAV.
12. The UAV of claim 1, wherein the controller is operable to control the lighting arrangement based on an ambient light level.
13. The UAV of claim 1, wherein the controller is operable to control the lighting arrangement based on a battery level of the UAV.
14. The UAV of claim 1, wherein the controller is operable to control the lighting arrangement based on a location of the UAV.
15. The UAV of claim 1, wherein the UAV comprises a power source and a motor, wherein the power source is arranged to power the motor, and wherein the power source is arranged to power the lighting arrangement.
16. The UAV of claim 1, wherein the camera arrangement and/or the lighting arrangement has a fixed orientation.
17. The UAV of claim 1, wherein the camera arrangement and/or the lighting arrangement has a dynamic orientation.
18. The UAV of claim 1, wherein the controller is operable to adjust an orientation of the camera arrangement and/or the lighting arrangement while the UAV is in-flight.
19. An unmanned aerial vehicle, UAV, comprising:
  a lighting arrangement configurable in an upwards-facing configuration; and
  a controller operable to cause, in anticipation of and/or during take-off, the lighting arrangement to illuminate airspace directly above the UAV.

* * * * *